US008777511B1

(12) United States Patent
Rose

(10) Patent No.: US 8,777,511 B1
(45) Date of Patent: Jul. 15, 2014

(54) SYSTEM AND METHOD FOR A LAW ENFORCEMENT OFFICER TO TEMPORARILY DISABLE A VEHICLE DURING A TRAFFIC STOP

(76) Inventor: Shawn G Rose, Allentown, PA (US)

( * ) Notice: Subject to any disclaimer, the term of this patent is extended or adjusted under 35 U.S.C. 154(b) by 0 days.

(21) Appl. No.: 13/457,439

(22) Filed: Apr. 26, 2012

(51) Int. Cl.
*E05B 73/00* (2006.01)
*E01F 13/00* (2006.01)
*B62H 5/14* (2006.01)

(52) U.S. Cl.
USPC ...................................... 404/6; 70/19; 70/226

(58) Field of Classification Search
USPC ........ 404/6–9; 70/14, 19, 225, 226, 259, 260, 70/228; 24/495, 496, 612; 188/5, 19, 31, 188/166
See application file for complete search history.

(56) References Cited

U.S. PATENT DOCUMENTS

| | | | | |
|---|---|---|---|---|
| 621,072 | A * | 3/1899 | Gregory | 211/5 |
| 2,639,813 | A * | 5/1953 | Risvold et al. | 211/19 |
| 4,164,131 | A * | 8/1979 | Desmond et al. | 70/14 |
| 4,846,725 | A * | 7/1989 | Williams et al. | 439/479 |
| 5,186,585 | A * | 2/1993 | Sousa et al. | 410/9 |
| 6,623,205 | B1 * | 9/2003 | Ramirez | 404/6 |
| 6,749,362 | B1 * | 6/2004 | Eichenberg | 404/6 |
| 6,994,488 | B2 * | 2/2006 | Crowley, Sr. | 404/6 |
| 7,186,052 | B2 * | 3/2007 | Rom | 404/6 |
| 2006/0096340 | A1 * | 5/2006 | Laquieze et al. | 70/225 |
| 2009/0178446 | A1 * | 7/2009 | Patterson | 70/259 |
| 2011/0135385 | A1 * | 6/2011 | Washington | 404/6 |
| 2011/0226022 | A1 * | 9/2011 | Caldwell | 70/19 |

* cited by examiner

*Primary Examiner* — Abigail A. Risic
(74) *Attorney, Agent, or Firm* — LaMorte & Associates, P.C.

(57) ABSTRACT

A system and method for temporarily hindering the ability of a vehicle to be driven. A locking assembly is provided that has arms and a trigger release. At least one spring element is provided for biasing the arms into a locked configuration. The arms are cocked into the open configuration against the bias of the spring element. When the trigger release is activated, the arms automatically spring back to the locked configuration. An elongated application pole is provided that is used to propel the locking assembly a wheel of the vehicle. The contact activates the trigger release and causes the arms to move into the locked configuration and mechanically engage the wheel. Once the locking assembly is locked onto the wheel, the wheel is inhibited from turning and the vehicle becomes disabled.

14 Claims, 6 Drawing Sheets

SYSTEM AND METHOD FOR A LAW ENFORCEMENT OFFICER TO TEMPORARILY DISABLE A VEHICLE DURING A TRAFFIC STOP

BACKGROUND OF THE INVENTION

1. Field of the Invention

In general, the present invention relates to wheel lock devices that lock around a vehicle's wheel and prevent that vehicle from being driven.

2. Prior Art Description

Law enforcement officers make thousands of traffic stops each year. When a traffic stop is made, protocols require that the license plate number of the vehicle be checked prior to the law enforcement officer approaching the stopped vehicle. This provides the law enforcement officer with certain important information, such as if the vehicle is stolen or if the owner of the vehicle is wanted by the law. If such a situation occurs, a law enforcement officer will call for backup before approaching the vehicle.

However, the vast majority of license plate checks after traffic stops produce no unusual information. Accordingly, protocols dictate that the law enforcement officer approaches the driver of the stopped vehicle. Statistics show that this is one of the most dangerous situations for a law enforcement officer to be in. The driver of the vehicle can be drunk, high on drugs, or just prone to panic. Regardless of the reason, a significant percentage of drivers that have been pulled over attempt to flee. These attempts to flee often occur when the law enforcement officer is out of his/her vehicle and is standing next to the stopped vehicle. The result is that a law enforcement officer can be injured or killed by the fleeing vehicle. Even if the officer is not injured, the officer is delayed in chasing the fleeing vehicle since the officer must return to his/her car in order to begin pursuit.

There exists a long felt need for a system that can enable a law enforcement officer to disable a vehicle as that officer approaches the vehicle. Using existing technology, a vehicle can be disabled by placing a boot on a wheel or by placing tire puncture strips in front of and behind the vehicle. However, using prior art systems, both of these techniques require that a law enforcement officer either reach under a vehicle or stand in front of a vehicle. In either scenario, the officer places his/her body in danger especially since the officer must take his/her eyes away from the driver of the vehicle during the procedure. Accordingly, the use of prior art wheel locks and tire puncturing strips actually increases the danger to an officer during a traffic stop.

A need therefore exists for a system and method of disabling a vehicle that can be done without placing the law enforcement officer in a dangerous position and without causing the law enforcement officer to have his/her attention distracted away from the driver. This need is met by the present invention as described and claimed below.

SUMMARY OF THE INVENTION

The present invention is a system and method for temporarily hindering the ability of a vehicle to be driven after the vehicle has been stopped by a law enforcement officer. The system includes a locking assembly that has arms and a trigger release. The arms are selectively configurable between an open configuration and a locked configuration. At least one spring element is provided for biasing the arms into their locked configuration. The arms can be cocked into the open configuration against the bias of the spring element. Once cocked, the arms can be temporarily locked into that open configuration using the trigger release. When the trigger release is activated, the arms automatically spring back to the locked configuration.

An elongated application pole is provided to set the locking assembly into place and to remove the locking assembly after the traffic stop. The application pole can be adjusted in length. The application pole has a first end that engages the locking assembly and can be used to propel the locking assembly along the ground and into contact with a wheel of the vehicle. The contact activates the trigger release and causes the arms to move into the locked configuration and mechanically engage the wheel. Once the locking assembly is locked onto the wheel, the wheel is inhibited from turning and the vehicle becomes disabled.

After the traffic stop, a law enforcement officer can engage the locking assembly with the elongated application pole. Using a simple manipulation, the locking assembly disengages the wheel and the vehicle is free to drive.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention vehicle disabling system can be embodied in many ways, the embodiment illustrated is selected in order to set forth the best mode contemplated for the invention. The illustrated embodiment, however, is merely exemplary and should not be considered a limitation when interpreting the scope of the appended claims.

Figure 1:
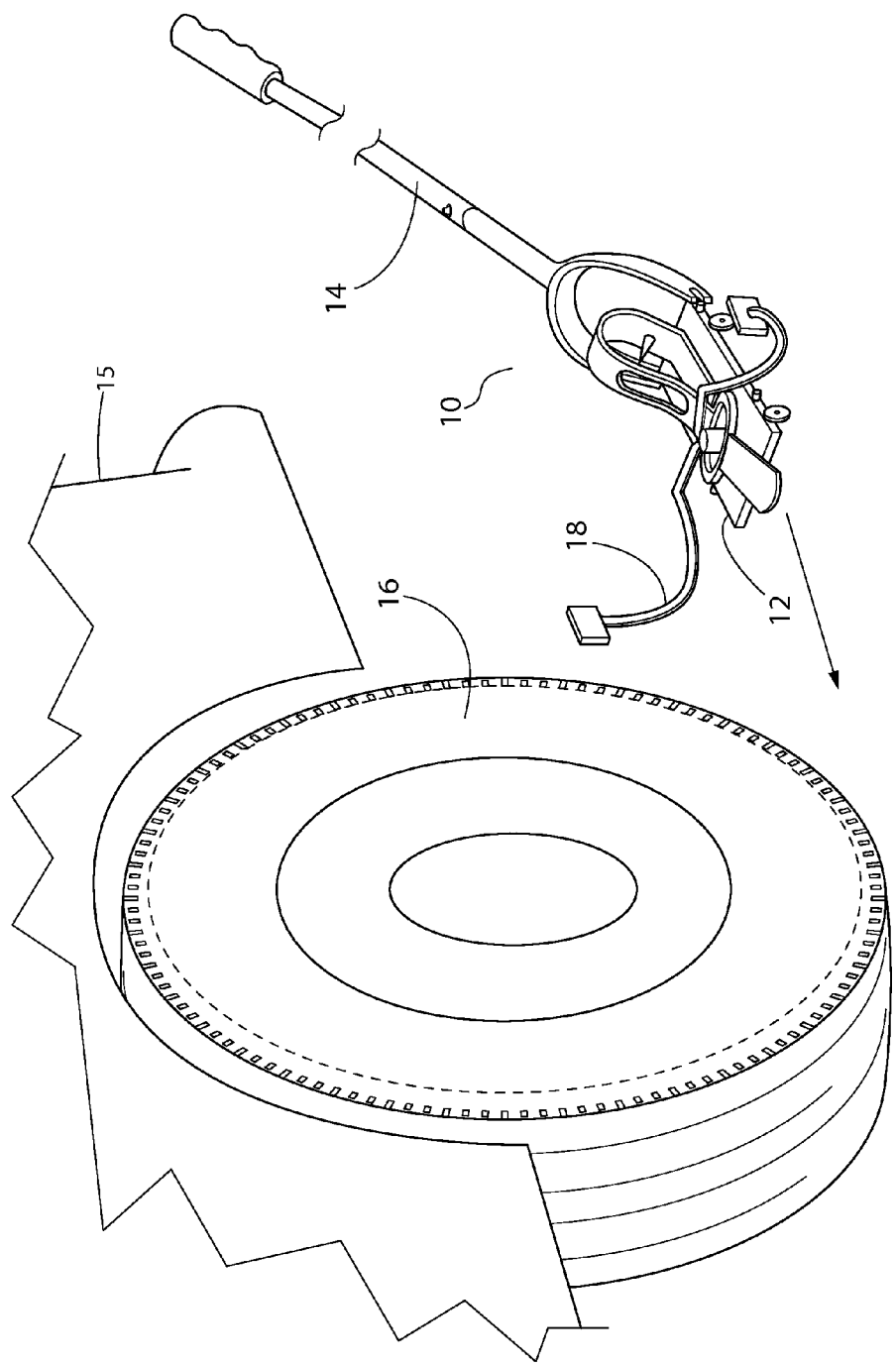
FIG. 1 is a perspective view of an exemplary embodiment of a vehicle disabling system shown in conjunction with a vehicle wheel.
Figure 2:
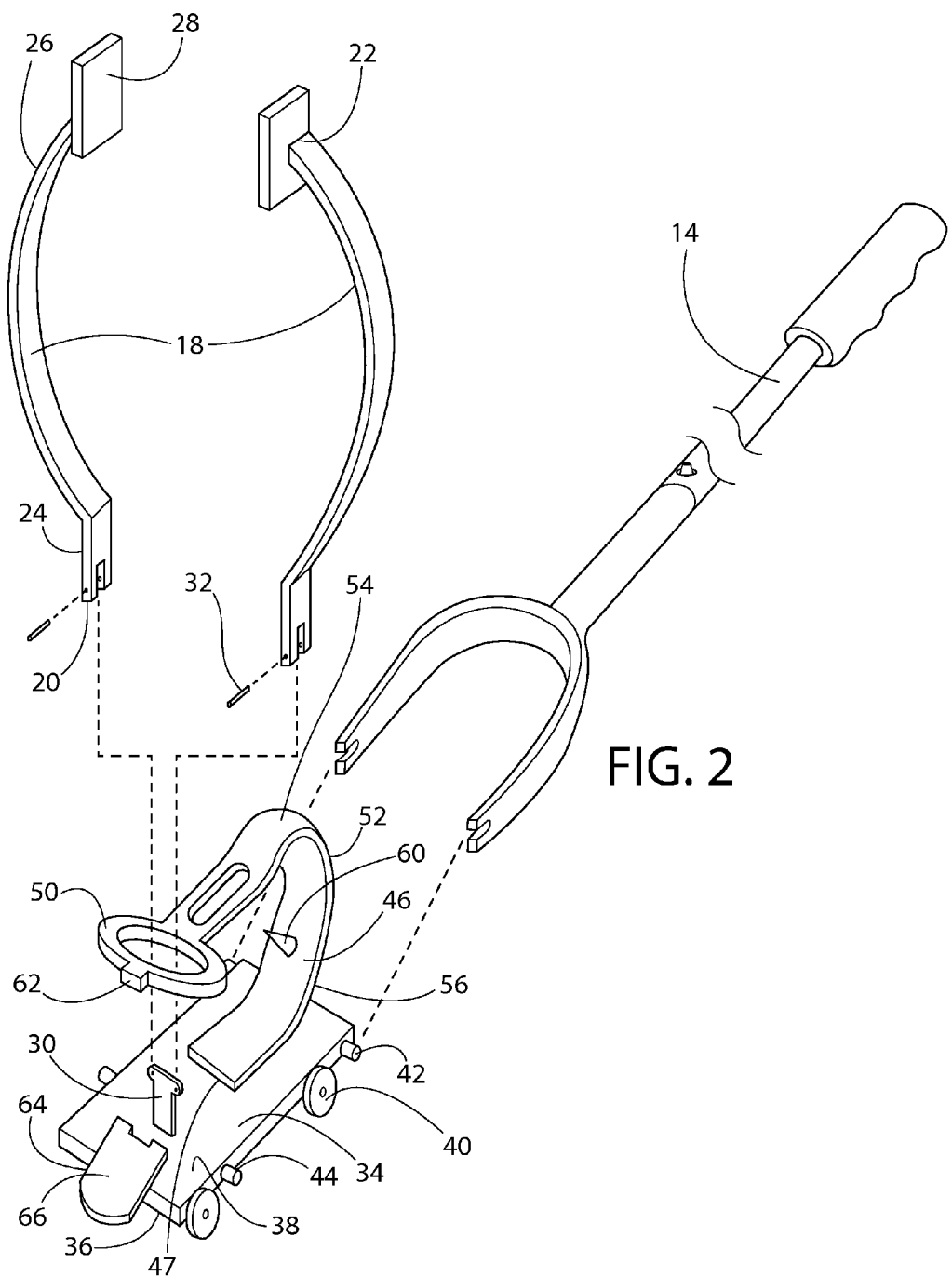
FIG. 2 is an exploded view of the exemplary embodiment of FIG. 1.

Referring to both FIG. 1 and FIG. 2, a vehicle disabling system 10 is shown. The vehicle disabling system 10, in general, is comprised of a locking assembly 12 and an elongated application pole 14. As will be explained in detail, the locking assembly 12 is attached to the end of the application pole 14. As a law enforcement officer approaches a stopped vehicle 15 from behind, the law enforcement officer pushes the locking assembly 12 against the rear wheel of the stopped vehicle 15. The locking assembly 12 automatically locks against the wheel 16 when it contacts the wheel 16. The law enforcement officer never has to stoop down or otherwise divert his/her attention from the occupants of the vehicle 15.

Once the locking assembly 12 attaches to the wheel 16, the locking assembly 12 will disable the wheel 16, and thus the vehicle 15, should someone attempt to drive the vehicle 15 before the locking assembly 12 is removed. Again, in order to remove the locking assembly 12, the law enforcement officer need only engage the locking assembly 12 with the application pole 14. The law enforcement officer never places his/her body in a vulnerable position.

Figure 3:
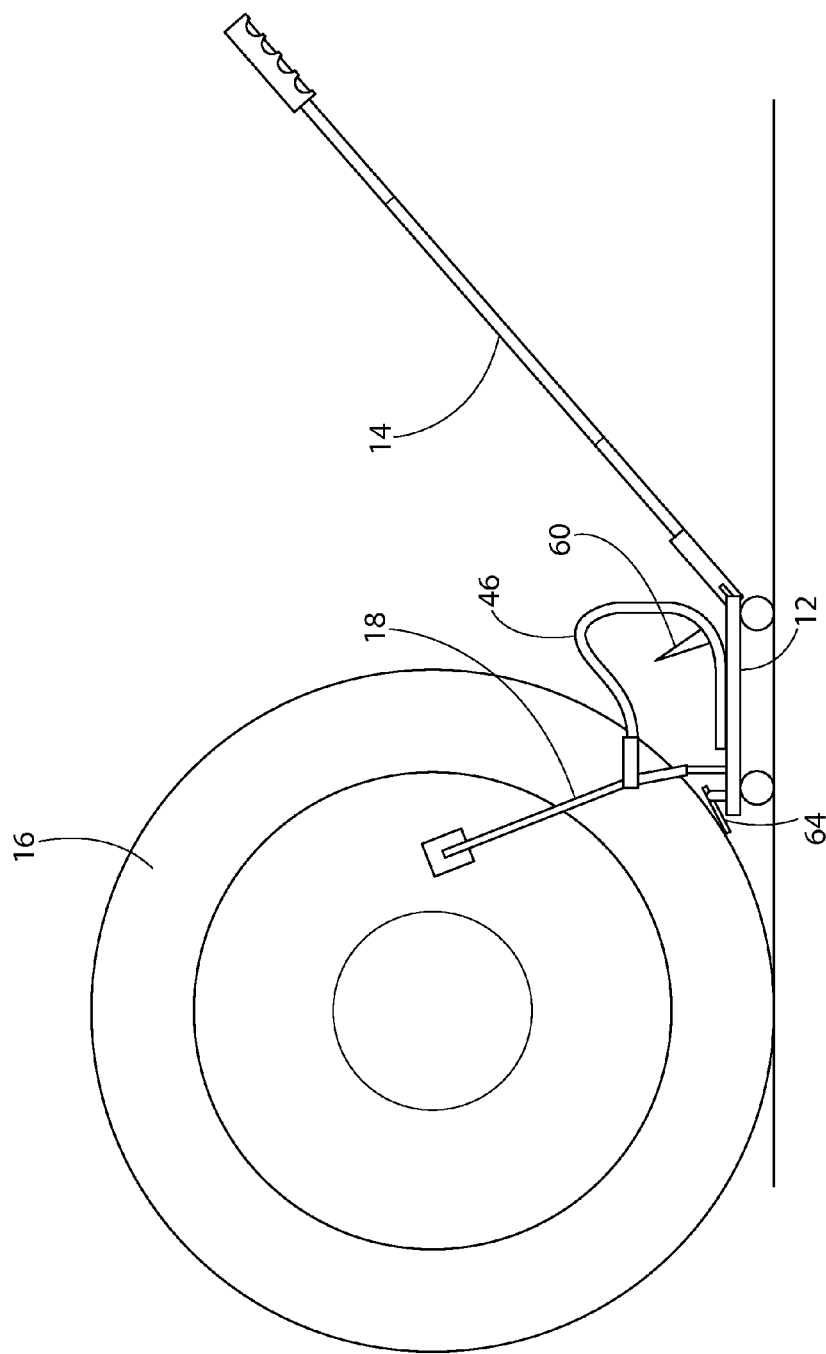
FIG. 3 is a side view of the exemplary embodiment.

Referring to FIG. 2 and FIG. 3 in conjunction with FIG. 1, it can be seen that the locking assembly 12 contains two contoured arms 18. Each of the contoured arms 18 has a bottom end 20, a top end 22, a straight section 24 that extends from the bottom end 20 and a curved section 26 that extends from the straight section 24 to the top end 22. Rubber padded stops 28 are affixed to the top ends 22 of the contoured arms 18 to prevent any contact damage to the wheel rims of the vehicle 15.

The bottom ends 20 of the contoured arms 18 are connected to a pivot post 30 with pivot connections 32. The pivot connections 32 enable the contoured arms 18 to be selectively rotated from an open configuration, where the padded stops 28 are far apart, to a locked configuration, where the padded stops 28 are positioned close together. Small torsion springs (not shown) can be provided at the pivot connections 32 that bias the contoured arms 18 apart into their open configuration.

The pivot post 30 extends upwardly from a support platform 34. The support platform 34 has a bottom surface 36 and a top surface 38. The support platform 34 is shown having an optional set of small wheels 40 extending below its bottom surface 36. The wheels 40 help the support platform 34 roll along the ground. However, such wheels are not necessary and it will be understood that the support platform 34 can simply slide along the ground even if no wheels were present.

Two sets of pole attachment projections 42, 44 extend from the support platform 34. The first set of pole attachment projections 42 are located near the distal end of the support platform 34. The second set of pole attachment projections 44 are located near the pivot post 30. The purpose of the two sets of pole attachment projections 42, 44 is later explained.

A curved spring 46 is provided. A first end 47 of the curved spring 46 is anchored to the top surface 38 of the support platform 34. An opposite second end 48 of the curved spring 46 terminates with an end loop 50. The end loop 50 encircles the pivot post 30 and the contoured arms 18. The curved spring 46 has a primary bend 52 between its first end 47 and the end loop 50. This divides the curved spring 46 into an upper section 54 and a lower section 56. The upper section 54 extends from the primary bend 52 to the end loop 50. The lower section 56 extends from the primary bend 52 to the first end 47. A slot 58 is formed down the center of the upper section 54 of the curved spring 46. Furthermore, at least one spike 60 extends upwardly from the lower section 56 of the curved spring 46. The purpose of the slot 58 and the spike 60 are later explained.

The curved spring 46 biases the end loop 50 as far up the contoured arms 18 as it is capable of moving. As the end loop 50 moves up the contoured arms 18, the contoured arms 18 are forced together into their locked configuration. However, the end loop 50 can be moved down against the bias of the curved spring 46. When the end loop 50 descends below the contoured arms 18, the contoured arms 18 are free to extend into their spread open configuration.

A locking tab 62 extends from the end loop 50. Furthermore, a trigger release 64 is coupled to the support platform 34. As is shown in FIG. 2, the curved spring 46 can be deformed against its bias until the locking tab 62 on the end loop 50 is engaged by the trigger release 64. The trigger release 64 prevents the end loop 50 from rising up until a contact pad 66 on the trigger lease 64 is contacted and the trigger release 64 disengages the locking tab 62. Since the end loop 50 surrounds the pivot post 30 and is below the contoured arms 18, the contoured arms 18 can be moved to their spread open configuration. The locking assembly 12 is now set and is ready for use by a law enforcement officer.

A law enforcement officer attaches the application pole 14 to the locking assembly 12 by engaging the application pole 14 with the first set of pole attachment projections 42. The application pole 14 is preferably adjustably a telescoping pole that can be selectively adjusted in length. In this manner, the pole can be made short for storage and can be extended to different lengths for use on different types of vehicles.

Using the application pole 14, a law enforcement officer can push the locking assembly 12 along the ground toward the wheel 16 of a vehicle 15. As the locking assembly 12 gets close to the wheel 16, the contoured arms 18 pass around the wheel 16. As soon as the contact pad 66 touches the wheel 16, the trigger release 64 disengages the end loop 50. The bias provided by the curved spring 46 moves the end loop 50 up the contoured arms 18. This causes the contoured arms 18 to come together and lock into their locked configuration around the wheel 16.

Figure 4:
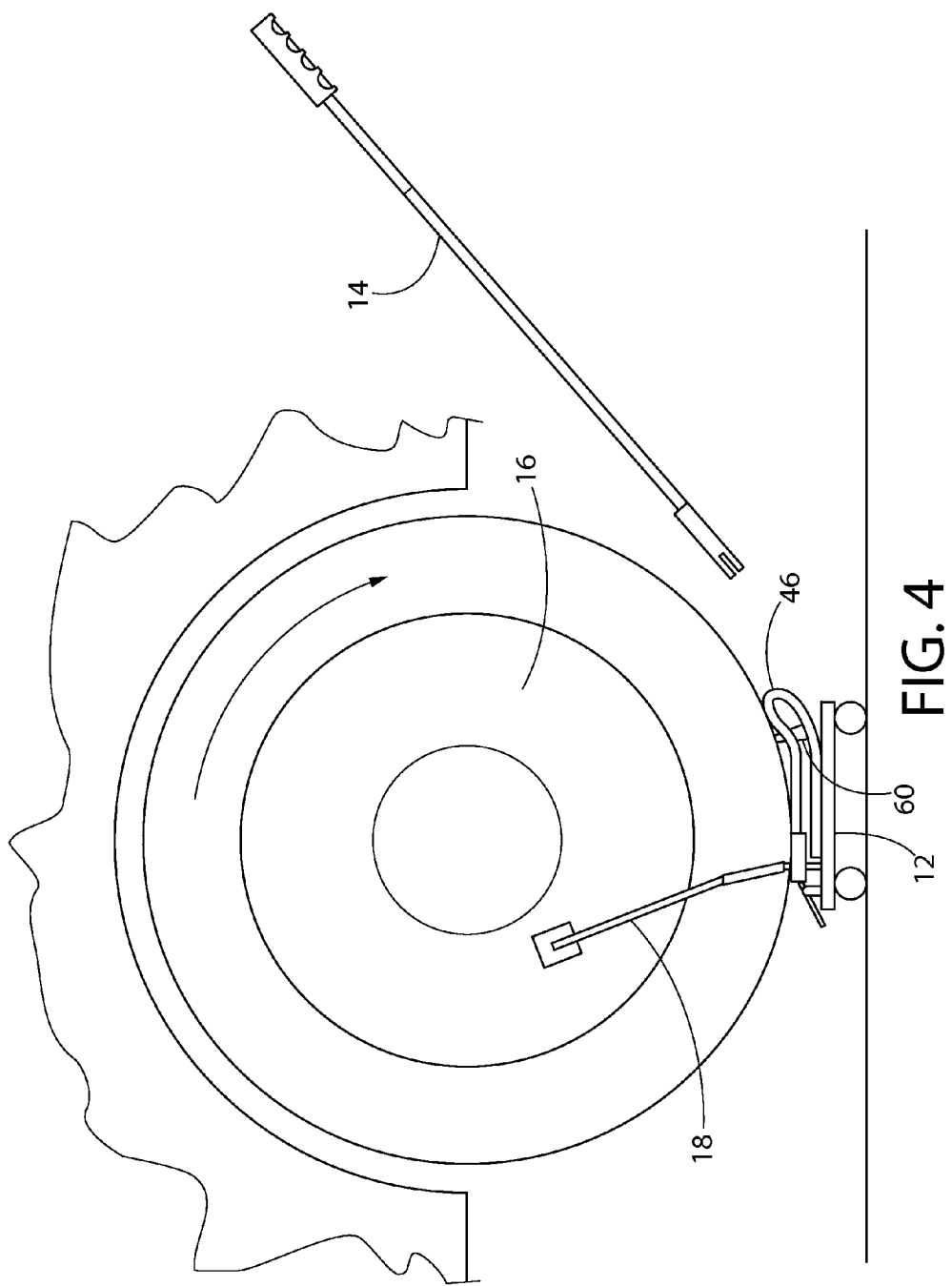
FIG. 4 is a side view of the exemplary embodiment in a locked condition engaging a wheel of a vehicle moving in reverse.
Figure 5:
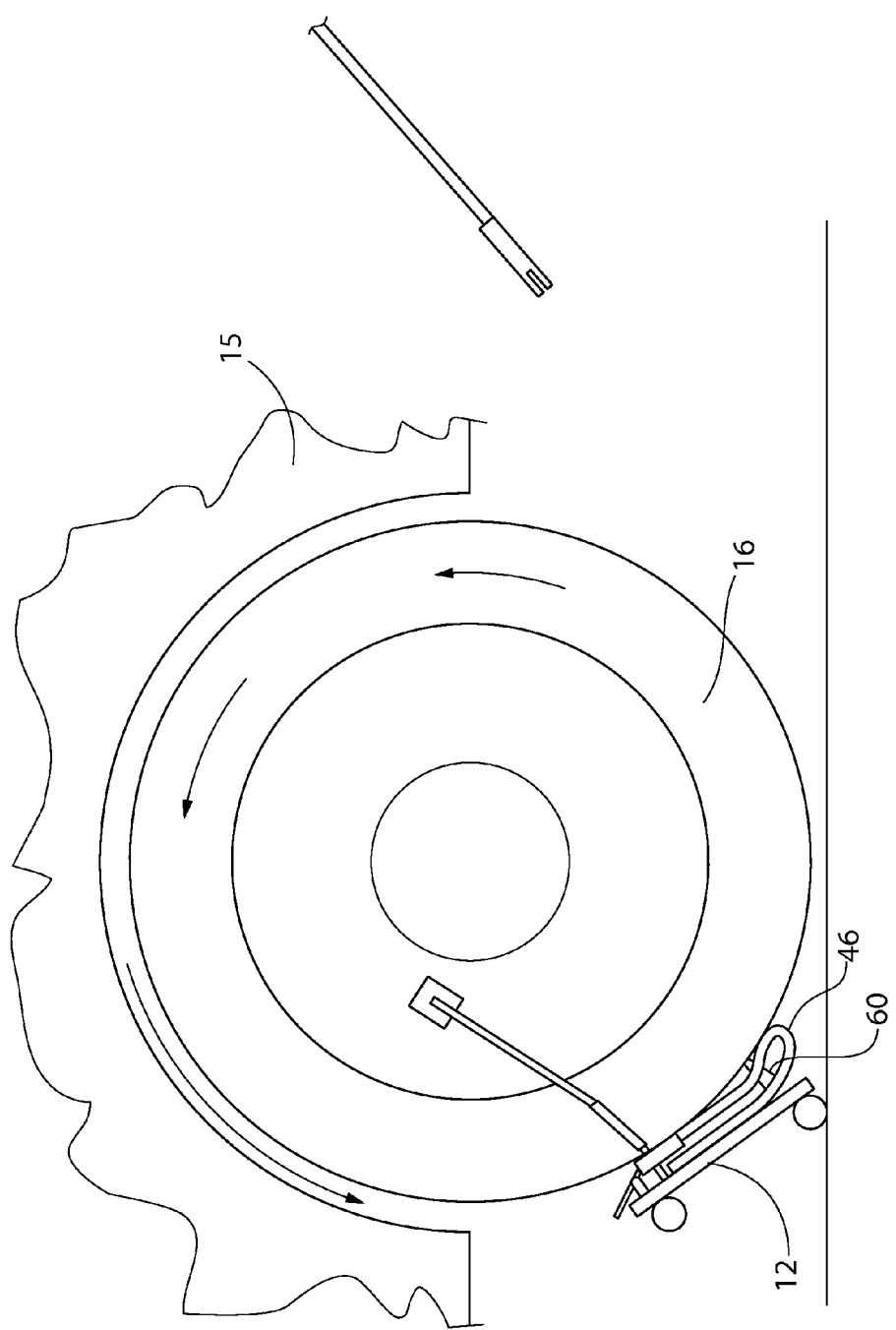
FIG. 5 is a side view of the exemplary embodiment in a locked condition engaging a wheel of a vehicle moving forward.

Referring to FIG. 3, FIG. 4 and FIG. 5 in conjunction with FIG. 2, it can be seen that once the locking assembly 12 is attached to the wheel 16, the law enforcement officer can pull the application pole 14 away from the locking assembly 12 and can then approach the vehicle 15 in any manner he/she sees fit. As is indicated in FIG. 4, if the driver of the vehicle 15 attempts to drive the vehicle 15 in reverse, the wheel 16 of the vehicle 15 will run over the locking assembly 12. As is indicated in FIG. 5, if the driver of the vehicle 15 attempts to drive forward, the locking assembly 12 will rotate with the wheel 16 and will become run over by the wheel 16. In either scenario, the locking assembly 12 will become compressed between the wheel 16 and the ground. As the locking assembly becomes compressed, the curved spring 46 becomes compressed against the wheel 16. As the curved spring 46 becomes compressed, the spike 60 passes through the slot 58 in the upper section 54 of the spring 46 and punctures the tire on the wheel 16. As such, the ability of the vehicle 15 to flee any significant distance is severely hampered.

Figure 6:
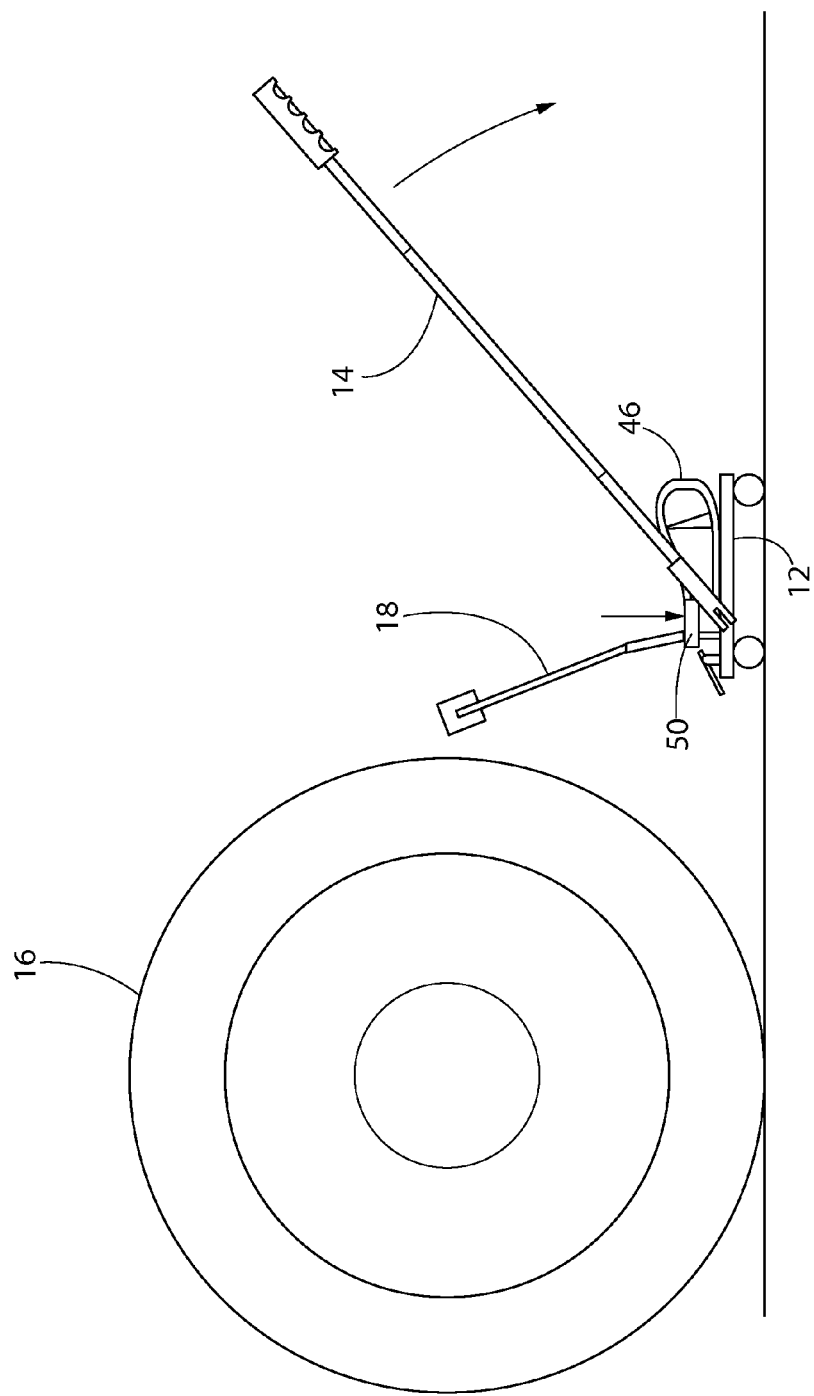
FIG. 6 is a side view of the exemplary embodiment being unlocked using the application pole.

Referring to FIG. 6 in conjunction with FIG. 2, it can be seen that if the vehicle does not flee, the locking assembly 12 can be removed by engaging the application pole 14 with the second set of pole attachment projections 44. In this position, the yoke of the application pole 14 is above the upper section 54 of the curved spring 46. When the application pole 14 is pushed down in the direction of arrow 68, the application pole 14 presses the upper section 54 of the locking assembly 12 down toward the lower section 56. This moves the end loop 50 down below the contoured arms 18 and enables the contoured arms 18 to again spread open. As the contoured arms 18 spread open, they disengage the wheel 16.

Referring to all figures, the vehicle disabling system 10 is used in the following manner. Once a law enforcement officer stops a vehicle, he/she places the locking assembly 12 on the ground in its open condition. Using the application pole 14, the law enforcement officer slides the locking assembly 12 into contact with the rear wheel 16 of the vehicle. Once the locking assembly 12 touches the wheel 16, it automatically springs close and locks onto the wheel 16 without damaging the wheel 16. The law enforcement officer has therefore engaged the locking assembly 12 without placing his/her person in a dangerous position and without losing sight of the vehicle's occupants.

Once the locking assembly 12 is locked into place, the law enforcement officer continues to proceed to the driver's side window to interact with the driver of the vehicle. Once license and registration is gathered, a law enforcement officer typically returns to his/her vehicle to write a ticket. As the law enforcement officer again approaches the vehicle with the ticket, the law enforcement officer can disengage the locking device 12 from the wheel by repositioning the application pole 14. The officer can then give the driver the ticket and the vehicle is free to leave.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A method of temporarily disabling a vehicle stopped during a traffic stop, said method comprising the steps of:
    providing a locking assembly with spring loaded arms and a trigger release, wherein said spring loaded arms can be temporarily opened to a spread configuration, and wherein said spring loaded arms automatically close to a closed configuration upon contact of said trigger release;
    providing an elongated application pole;
    pushing said locking assembly along the ground with said elongated application pole until said trigger release of said locking assembly contacts a wheel of a vehicle causing said spring loaded arms to move to said closed configuration and automatically lock onto said wheel, therein disabling said wheel of said vehicle.

2. The method according to claim 1, further including the step of unlocking said arms of said locking assembly and removing said locking assembly from said wheel using said elongated application pole when said traffic stop is complete.

3. The method according to claim 1, further including the step of providing at least one puncture spike on said locking assembly that punctures said wheel if said wheel rotates while said locking assembly is locked onto said wheel.

4. The method according to claim 1, further including the step of cocking said spring loaded arms into said spread configuration and setting said trigger release prior to said step of pushing said locking assembly along the ground.

5. The method according to claim 1, wherein said step of providing a locking assembly includes providing a base platform that supports said spring loaded arms, wherein said base platform is engaged and propelled by said elongated application pole.

6. The method according to claim 5, wherein said locking assembly includes wheels that enable said base platform to roll when pushed by said elongated application pole.

7. A method of hindering the mobility of a vehicle stopped by a law enforcement officer during a traffic stop, said method comprising the steps of:
    providing a locking assembly with spring loaded arms that can be cocked in an open configuration and set with a trigger release, wherein said spring loaded arms automatically close to a locked configuration upon contact of said trigger release;
    pushing trigger release of said locking assembly into contact with a wheel of said vehicle, wherein said spring loaded arms automatically spring into said locked configuration and engage said wheel;
    wherein said locking assembly includes at least one spike that can puncture said wheel if said wheel rotates while said locking assembly is engaged with said wheel.

8. The method according to claim 7, wherein said step of pushing said locking assembly into contact with a wheel of said vehicle includes providing an elongated application pole and pushing said locking assembly with said elongated application pole.

9. The method according to claim 8, further including the step of removing said locking assembly from said wheel using said elongated application pole when said traffic stop is complete.

10. The method according to claim 7, further including the step of cocking said arms into said open configuration and setting said trigger release prior to pushing trigger release of said locking assembly into contact with said wheel of said vehicle.

11. The method according to claim 8, wherein said step of providing a locking assembly includes providing a base platform that supports said spring loaded arms, wherein said base platform is engaged and propelled by said elongated application pole.

12. The method according to claim 11, wherein said locking assembly includes wheels that enable said base platform to roll when pushed by said elongated application pole.

13. A system for use by law enforcement to temporarily disable a motor vehicle after a traffic stop, said system comprising:
    a locking assembly having arms and a trigger release, wherein said arms are selectively configurable between an open configuration and a locked configuration;
    at least one spring element for biasing said arms into said locked configuration, wherein said arms can be cocked into said open configuration against said at least one spring element and temporarily locked into said open configuration with said trigger release, wherein said arms automatically spring back to said locked configuration when said trigger release is activated;
    an elongated application pole having a first end that engages said locking assembly and can be used to propel said locking assembly along the ground and into contact with a wheel of said vehicle, wherein said contact activates said trigger release and causes said arms to move to said locked configuration and mechanically engage said wheel.

14. The system according to claim 13, wherein said locking assembly includes at least one spike for puncturing said wheel should said vehicle be driven while said locking assembly is engaged with said wheel.

* * * * *